Patented Mar. 19, 1946

2,396,967

UNITED STATES PATENT OFFICE 2,396,967

VULCANIZATION OF SYNTHETIC RUBBER

Warren E. Phillips, Cuyahoga Falls, Ohio, assignor to The B. F. Goodrich Company, New York, N. Y., a corporation of New York No Drawing. Application October 11, 1943, Serial No. 505,844

8 Claims. (Cl. 260—79)

This invention relates to the vulcanization of synthetic rubber and pertains more specifically to the acceleration of vulcanization by means of the reaction products of a mercapto-arylthiazole with formaldehyde.

It is well known that the reaction products of formaldehyde with a mercapto-arylthiazole may be used to accelerate the vulcanization of natural rubber. Zimmerman Patent No. 1,960,197 describes both the preparation of these reaction products and their use in natural rubber. The use of this accelerator in natural rubber is characterized chiefly by the non-scorchy property of the rubber composition; that is, the accelerator is relatively ineffective at the temperatures usually employed for processing, about 230° F., and becomes effective only at the higher temperatures, over 275° F., usually employed for vulcanization.

I have now discovered that when the reaction product of formaldehyde with a mercapto-arylthiazole is used as an accelerator in the vulcanization of synthetic rubber, a vulcanized composition is produced having most unusual properties. It not only is non-scorchy, but it has a high flex resistance, and in addition, its hysteresis properties improve rather than deteriorate upon aging. Such a rubber is particularly valuable for use in any structure which is subject to repeated deformations, such as pneumatic tires, rubber vibration insulators, shock absorbers, springs, etc., because of the great reduction in heat build-up in such structures afforded by the use of my new composition, and the resultant increase in the life of the structure.

The accelerator employed in accordance with the present invention is described in the above-mentioned Zimmerman patent. Specific compounds which may be used include, among others, the reaction products of formaldehyde with mercaptobenzothiazole, with the mercapto-tolylthiazoles, the mercapto-xylylthiazoles, the mercapto-naphthothiazoles, and their homologues, as well as the reaction products of formaldehyde with similar compounds containing various substituent groups in the aromatic ring, such as 4-nitro-2-mercaptobenzothiazole, 5-hydroxy-2-mercaptobenzothiazole, 4-chloro-2-mercaptobenzothiazole, 4-amino-2-mercaptobenzothiazole, 4-methoxy-2-mercaptobenzothiazole, and other similar materials.

The synthetic rubbers with which my new process is effective to produce compositions having excellent hysteresis properties and flex-resistance are the rubbery materials vulcanizable with sulphur made by the polymerization of butadiene-1,3 hydrocarbons with ethylenic monomers copolymerizable therewith. Among the butadiene-1,3 hydrocarbons which may be used are butadiene-1,3; isoprene; 2,3-dimethyl butadiene-1,3; piperylene; and the like. Ethylenic compounds which may be copolymerized with the foregoing butadiene-1,3 hydrocarbons include, for example, styrene, acrylonitrile, isobutylene, methyl acrylate, ethyl acrylate, methyl methacrylate, and the like.

The excellent properties of these vulcanized rubber compositions may be still further improved by employing in conjunction with an accelerator of the class described, a small amount of an aromatic carboxylic acid; particularly valuable are the aromatic acids in which the aryl radicals belong to the benzene series, such as benzoic acid, phthalic acid, and the like, and hydroxy-substituted acids of this type such as salicylic acid.

In order more clearly to show the superiority of my new composition, I shall describe a specific example of my invention and compare the results obtained with those obtained using a standard accelerator such as benzothiazyl 2-monocyclohexyl sulfenamide.

Example

The following compositions were prepared, in which the parts are by weight:

| | A | B |
|---|---|---|
| Rubbery copolymer of butadiene with styrene | 100 | 100 |
| Channel black | 45 | 45 |
| Sulfur | 1.75 | 1.75 |
| Stearic acid | 2.5 | 2.5 |
| Zinc oxide | 2.5 | 2.5 |
| Pine tar | 3.0 | 3.0 |
| Coal tar softener | 4.0 | 4.0 |
| Age-resister | 0.5 | 0.5 |
| Benzothiazyl 2-monocyclohexyl sulfenamide | 1.0 | |
| Reaction product of formaldehyde with mercaptobenzothiazole | | 3.25 |

A larger amount of accelerator was employed in Composition B than in Composition A in order to produce vulcanized rubber compositions having approximately equal initial hysteresis values, suitable for comparison. Samples of these compositions were vulcanized 75 minutes at 280° F., and tested in a Goodrich Flexometer, the construction and operation of which has been described by E. T. Lessig, Industrial and Engineering Chemistry (Analytical Edition) 9, 582 (1937). The results of the test are given in the following table, in which ΔTH is the increase in temperature of the sample when flexed at 212° F.

| Composition | ΔTH | Permanent set (%) at 212° F. |
|---|---|---|
| A | 68 | 21.1 |
| B | 72 | 26.5 |

Samples of the foregoing rubber compositions were then aged seven days in oxygen at 70° C. and 300 lbs. per sq. in. and tested in a Goodrich Flexometer under the same conditions as the original samples with the following results.

| Composition | ΔTH | Permanent set (%) at 212° F. |
|---|---|---|
| A | 86 | 33.4 |
| B | 53 | 21.2 |

These data indicate very clearly the superiority of my new vulcanized rubber composition over those containing a standard accelerator, especially in regard to resistance to deterioration upon aging.

Other samples of the foregoing composition were vulcanized for 60 minutes at 280° F. and then tested in a Di Mattia flexing machine. Composition A ruptured after only 8,000 flexures, whereas Composition B lasted 50% again as long.

The addition of two and one-half parts of salicylic acid to Composition B produced a tremendous increase in flex resistance. A test sample vulcanized as above had not ruptured even after 230,000 flexures.

Although the reaction product of formaldehyde with a mercaptoarylthiazole is an effective accelerator of the vulcanization of synthetic rubber in amounts as small as 0.1%, based on the rubber composition, I prefer to use from about 1.0 to about 5.0% or more for best results. The aromatic acid employed in conjunction with the activator may be present in amounts ranging from about 1.0 to about 10%, preferably from about 2 to 5%. Any of the usual pigments, fillers, reinforcing agents, softeners, anti-oxidants and the like may also be present in the composition without destroying its superior properties.

Although I have herein disclosed specific embodiments of my invention, I do not intend to limit myself solely thereto, but to include all of the obvious modifications within the spirit and scope of the appended claims.

I claim:

1. The method of vulcanizing a rubbery material made by the polymerization of a butadiene-1,3 hydrocarbon with an ethylenic compound copolymerizable therewith, which comprises heating it in the presence of sulfur and from about 0.1 to about 5% by weight of the reaction product of formaldehyde with a mercapto-arylthiazole, and in the presence of from about 1 to about 10% by weight of an aromatic carboxylic acid, said percentages being based upon the weight of the total composition.

2. The method of vulcanizing a rubbery material made by the polymerization of a butadiene-1,3 hydrocarbon with an ethylenic compound copolymerizable therewith, which comprises heating it in the presence of sulfur and from about 0.1 to about 5% by weight of the reaction product of formaldehyde with a mercapto-arylthiazole, and in the presence of from about 1 to about 10% by weight of salicylic acid, said percentages being based upon the weight of the total composition.

3. The method of vulcanizing a rubbery material made by the polymerization of a butadiene-1,3 hydrocarbon with styrene, which comprises heating it in the presence of sulfur and from about 0.1 to about 5% by weight of the reaction product of formaldehyde with a mercaptoarylthiazole in which the aryl group is a member of the benzene series, and in the presence of from about 1 to about 10% by weight of salicylic acid, said percentages being based upon the weight of the total composition.

4. The method of vulcanizing a rubbery material made by the polymerization of a butadiene-1,3 hydrocarbon with styrene, which comprises heating it in the presence of sulfur and from about 0.1 to about 10% by weight of the reaction product of formaldehyde with mercaptobenzothiazole and in the presence of from about 1 to about 10% by weight of salicylic acid, said percentages being based upon the weight of the total composition.

5. A composition comprising a rubbery material made by the polymerization of a butadiene-1,3 hydrocarbon with an ethylenic compound copolymerizable therewith vulcanized in the presence of from about 0.1 to about 5% by weight of the reaction product of formaldehyde with a mercapto-arylthiazole and in the presence of from about 1 to about 10% by weight of an aromatic carboxylic acid, said percentages being based upon the weight of said vulcanized composition.

6. A composition comprising a rubbery material made by the polymerization of a butadiene-1,3 hydrocarbon with an ethylenic compound copolymerizable therewith vulcanized in the presence of from about 0.1 to about 5% by weight of the reaction product of formaldehyde with a mercapto-arylthiazole and in the presence of from about 1 to about 10% by weight of salicylic acid, said percentages being based upon the weight of said vulcanized composition.

7. A composition comprising a rubbery material made by the polymerization of a butadiene-1,3 hydrocarbon with styrene vulcanized in the presence of from about 0.1 to about 5% by weight of the reaction product of formaldehyde with a mercapto-arylthiazole in which the aryl group is a member of the benzene series, and in the presence of from about 1 to about 10% by weight of salicylic acid, said percentage being based upon the weight of said vulcanized composition.

8. A composition comprising a rubbery material made by the polymerization of a butadiene-1,3 hydrocarbon with styrene vulcanized in the presence of from about 0.1 to about 5% by weight of the reaction product of formaldehyde with mercaptobenzothiazole, and in the presence of from about 1 to about 10% by weight of salicylic acid, said percentages being based upon the weight of said vulcanized composition.

WARREN E. PHILLIPS.

Certificate of Correction

Patent No. 2,396,967. March 19, 1946.

WARREN E. PHILLIPS

It is hereby certified that error appears in the printed specification of the above numbered patent requiring correction as follows: Page 2, second column, line 22, claim 4, for "about 10%" read *about 5%*; and that the said Letters Patent should be read with this correction therein that the same may conform to the record of the case in the Patent Office.

Signed and sealed this 9th day of July, A. D. 1946.

[SEAL]

LESLIE FRAZER,
*First Assistant Commissioner of Patents.*